(12) United States Patent
Harada (10) Patent No.: US 7,755,727 B2
(45) Date of Patent: Jul. 13, 2010

(54) LIQUID CRYSTAL DISPLAY MODULE

(75) Inventor: Kenichi Harada, Gobo (JP)

(73) Assignee: Keiwa Inc., Osaka (JP)

( * ) Notice: Subject to any disclaimer, the term of this patent is extended or adjusted under 35 U.S.C. 154(b) by 103 days.

(21) Appl. No.: 11/787,375

(22) Filed: Apr. 16, 2007

(65) Prior Publication Data

US 2007/0242199 A1    Oct. 18, 2007

(30) Foreign Application Priority Data

Apr. 18, 2006   (JP)   .............................. 2006-115057

(51) Int. Cl.
*G02F 1/1335*   (2006.01)

(52) U.S. Cl. ....................................... 349/117; 349/96
(58) Field of Classification Search ................... 349/96, 349/99, 100–103, 117
See application file for complete search history.

(56) References Cited

U.S. PATENT DOCUMENTS

| 5,587,816 A  * | 12/1996 | Gunjima et al. ............... 349/62 |
| 5,712,694 A  * | 1/1998  | Taira et al. ...................... 349/9 |
| 6,852,396 B1 * | 2/2005  | Mineo ......................... 428/212 |
| 2005/0063062 A1* | 3/2005 | Ito et al. ..................... 359/599 |

FOREIGN PATENT DOCUMENTS

| EP | 1 760 517 | | 3/2007 |
| JP | 9-506985 | | 7/1997 |
| JP | 2000162549 A | * | 6/2000 |
| JP | 2004319171 A | * | 11/2004 |
| JP | 2005-106959 | | 4/2005 |
| KR | 10-0264415 | | 5/2000 |
| WO | WO-95/17692 | | 6/1995 |

* cited by examiner

*Primary Examiner*—Michelle R Connelly Cushwa
(74) *Attorney, Agent, or Firm*—Jordan and Hamburg LLP (57) ABSTRACT

Provided is a liquid crystal display module having a liquid crystal display element, an optically anisotropic optical sheet on a backside of the display element, and a backlight element on the backside of the optical sheet. The angle of the phase advancing axial orientation or the phase retarding axial orientation, measured with respect to the short side of the display, of the optical sheet is at least π/16 but not more than 3π/16.

5 Claims, 7 Drawing Sheets

LIQUID CRYSTAL DISPLAY MODULE

BACKGROUND OF THE INVENTION

1. Field of Invention

The present invention relates to liquid crystal display modules capable of markedly enhancing utilization efficiency of rays of light and improving luminance.

2. Description of the Related Art

Liquid crystal display (LCD) modules have been frequently used as a flat panel display through utilizing features such as thinness, lightness in weight, low level of electric power consumption and the like, and applications thereof have been increasing year by year as display devices for information such as mobile phones, personal digital assistances (PDA), personal computers and televisions. In recent years, characteristics demanded for liquid crystal display modules vary depending on their applications, but may include brightness (high luminance), visibility (widening of viewing angle), energy saving, thin and light modeling capability and the like. In particular, high luminance has been strongly desired.

Figure 9:
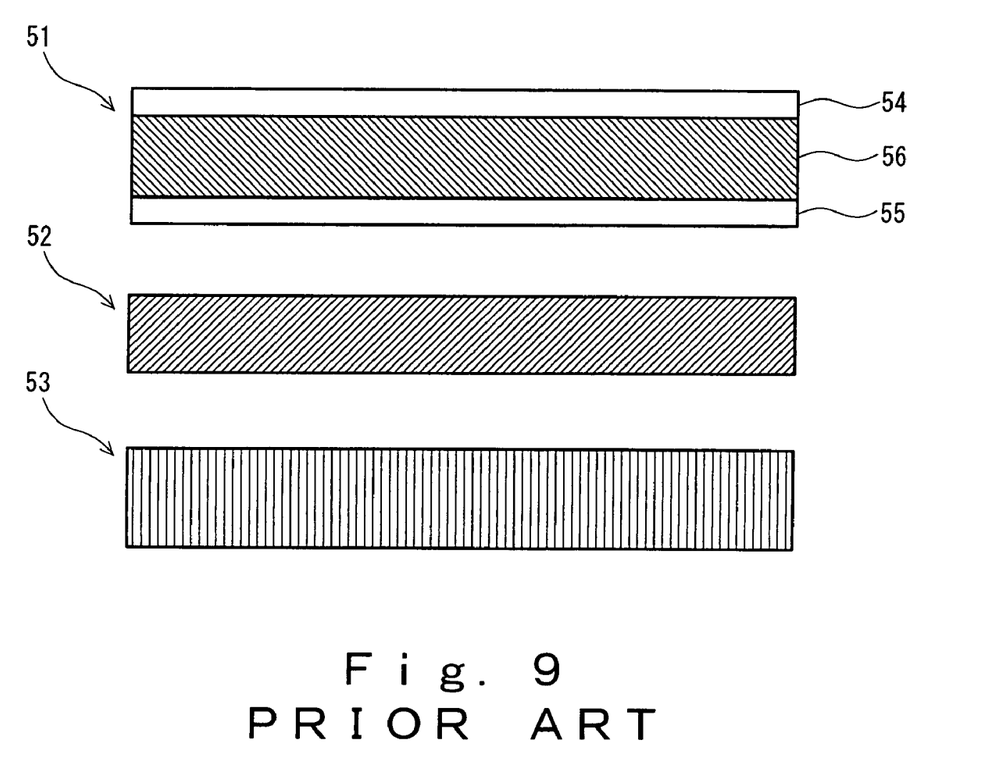
FIG. 9 shows a schematic cross-sectional view illustrating a general liquid crystal display module.

Conventional common liquid crystal display modules have a structure in which as shown FIG. 9, liquid crystal display element 51, a variety of optical sheets 52 and backlight 53 are superposed from the front face side to the back face in this order. The liquid crystal display element 51 has a structure in which liquid crystal cell 56 is sandwiched between a pair of polarizing plates 54, 55, and various display modes such as TN and IPS were proposed. The backlight 53 allows the liquid crystal display element 51 to execute light emission by irradiating from the back face side, and modes such as edge light type, immediate beneath type and the like have been in widespread use. The various optical sheets 52 are superposed between the liquid crystal display element 51 and the backlight 53, and a light diffusion sheet, a prism sheet and the like are included having an optical function such as refraction and diffusion in an orientation along a normal line for the purpose of allowing the rays of light exited from the front face of the backlight 53 to enter into the entire face of the liquid crystal display element 51 efficiently and uniformly.

Generally used polarizing plates 54, 55 provided in the liquid crystal display element 51 are those which exhibit absorption dichroism, i.e., absorption of one directional component of a light accompanied by transmission of remaining polarization components. This type of the polarizing plates 54, 55 absorb 50% of the light, in principle, for achieving polarization, therefore, it falls under one great reason for deterioration of the utilization efficiency of the light in the liquid crystal display module.

In order to minimize the decrease in utilization efficiency of the light by the polarizing plates 54, 55, a technique of superposing a reflection polarizing plate (polarization splitter) on the back face side of the polarizing plate 55 positioned on the back face side in the liquid crystal display module, as well as a technique of using the reflection polarizing plate in place of the polarizing plate 55 positioned on the back face side were developed (for example, see JP-A-2005-106959, JP-T 9-506985 (the term "JP-T" as used herein means a published Japanese translation of a PCT application)). This reflection polarizing plate 55 positioned on the back face side allows transmission axis components of the polarizing plate to transmit directly, while other polarization components are allowed to return to the lower side, thereby recycling the rays of light.

Also according to the liquid crystal display module in which such reflection polarizing plates are used, just approximately 75% of the utilization efficiency of the rays of light can be achieved in fact due to loss of the recycled light caused by thermal absorption, reflection and the like.

SUMMARY OF THE INVENTION

The present invention was made in view of these disadvantages, and an object of the present invention is to provide a liquid crystal display module capable of markedly enhancing utilization efficiency of rays of light and dramatically improving luminance.

The present inventor elaborately investigated polarization characteristics of each constituent element of the liquid crystal display module, and consequently found that decrease in utilization efficiency of the rays of light results from polarization of intensity of the rays of light outgoing from the backlight, and the polarization direction thereof is not consistent with the orientation of the transmission axis of the polarizing plate positioned on the back face side.

Consequently, one aspect of the present invention made for solving the aforementioned problems is a rectangular liquid crystal display module which comprises a liquid crystal display element in which a liquid crystal cell is sandwiched between a pair of polarizing plates, an optical sheet overlaid on the back face side of the liquid crystal display element, and a surface illuminant backlight overlaid on the back face side of the optical sheet, wherein the optical sheet comprises a resin substrate film having an optical anisotropy, and provided that: with respect to the short side orientation as a base, angle of the polarization orientation of the rays of light outgoing from the backlight front face is designated as γ; and angle of the transmission axial orientation of the back face side-polarizing plate is designated as δ, the angle of the crystallographic axial orientation of the substrate film falls within the range of ±50% of a value ε (i.e., falling within the range of from 0.5×ε or greater to 1.5×ε or less) calculated by the following mathematical formula (I) and mathematical formula (II):

$$\epsilon = \gamma + (\delta - \gamma)/2 \text{ in the case of } \gamma \leq \delta; \text{ and} \quad (I)$$

$$\epsilon = \delta + (\gamma - \delta)/2 \text{ in the case of } \gamma \geq \delta. \quad (II)$$

In the liquid crystal display module which includes an optical sheet having an optically anisotropic resin substrate film, by making the angle of the crystallographic axial orientation of this substrate film with respect to the short side orientation fall within the range of ±50% of the value ε calculated by the above mathematical formula (I) and mathematical formula (II), polarization components of the rays of light outgoing from the front face of the backlight can be converted into the transmission axial orientation of the polarizing plate or the reflection polarizing plate (hereinafter, the function referred to as "polarizing function of the back face side-polarizing plate to the transmission axial orientation"). Hence, light components which had been conventionally reflected for recycling can be transmitted efficiently, and thus, utilization efficiency of the rays of light can be enhanced. Accordingly, the liquid crystal display module markedly enhances utilization efficiency of rays of light emitted from the lamp, and thus, high-luminance, energy-saving, and thin and light modeling which have been socially demanded these days can be facilitated.

The aforementioned crystallographic axial orientation of the substrate film preferably follows the phase advancing axial orientation. Decision of the angle with respect to the short side orientation on the basis of the phase advancing axial orientation in such a manner can improve the utilization efficiency of the rays of light to some extent than the decision on the basis of the phase retarding axial orientation.

The retardation value of the substrate film is preferably 140 nm or greater and 390 nm or less. By thus regulating the retardation value of the substrate film to be 140 nm or greater and 390 nm or less, phase contrast of the optical sheet can be optimized so that the aforementioned polarizing function of the back face side-polarizing plate to the transmission axial orientation can be performed, and thus utilization efficiency of the rays of light can be markedly enhanced. Moreover, because the aforementioned numerical range of the retardation value of the substrate film is comparatively small as a retardation value for optimizing the phase contrast of optical sheets, ease of manufacture of the substrate film also becomes favorable.

Matrix resin constituting the substrate film is preferably polyethylene terephthalate or polycarbonate. This polyethylene terephthalate has a property to provide comparatively high retardation value, and the retardation value can be readily and certainly optimized as described above. Also, the retardation value can be readily regulated when polycarbonate is used.

It is desired that the optical sheet has an optical layer laminated on one face of the substrate film. Since the optical sheet having an optical layer such as a light diffusion layer, prism layer and the like, and having some optical function is generally provided between the liquid crystal display element and the backlight, the aforementioned polarizing function of the back face side-polarizing plate to the transmission axial orientation can be imparted to the substrate film of the optical sheet generally provided as in the means described above without adding a new optical sheet, whereby utilization efficiency of the rays of light can be markedly enhanced, and luminance heightening and energy saving can be facilitated.

The optical layer may be (a) one including multiple particles of a light diffusing agent and a binder therefor (light diffusion layer of light diffusion sheet), or (b) one having minute irregular shape having refractivity (prism part layer or the like of prism sheet). Because such a light diffusion sheet and prism sheet is used generally in liquid crystal display modules, the aforementioned polarizing function of the back face side-polarizing plate to the transmission axial orientation can be imparted without leading to increase in number of the optical sheets to be provided, whereby utilization efficiency of the rays of light can be markedly enhanced, and luminance heightening and energy saving can be facilitated.

The optical sheet may have a sticking preventive layer which is laminated on another face of the substrate film, and includes beads dispersed in a binder. By thus providing the sticking preventive layer on the face opposite to the optical layer in the optical sheet, sticking is prevented between the optical sheet and the optical waveguide plate, the prism sheet or the like disposed to the back face side.

The liquid crystal display module is suited in the case in which the edge light type backlight is used. Because the edge light type backlight is characterized in that polarization becomes comparatively great in both of the parallel direction and vertical direction, utilization efficiency of the rays of light can be markedly enhanced, and luminance heightening and energy saving can be facilitated by imparting to the transmission axial orientation to the substrate film of the optical sheet the aforementioned polarizing function of the back face side-polarizing plate.

When other optical sheet is provided between the liquid crystal display element and the backlight in the liquid crystal display module, a low-retardation film may be used as the substrate film of the other optical sheet. In general, liquid crystal display modules have multiple optical sheets such as light diffusion sheet, prism sheet and the like. When multiple optical sheets are provided in this manner, optimization and regulability of polarization to the transmission axial orientation of the back face side-polarizing plate can be facilitated by imparting only to the substrate film of particular one optical sheet the aforementioned polarizing function of the back face side-polarizing plate to the transmission axial orientation, while preventing conversion of the polarization orientation of the transmitted rays of light by other optical sheet.

Herein, the term "optical sheet" refers to such sheets also conceptually involving the aforementioned substrate film alone. The term "polarization orientation of the rays of light" means a direction of the plane including maximum polarization components of the rays of light. The term "angle of each direction with respect to the short side orientation as a base" refers to the angle on single plane of each orientation, and means the angle represented by "+" in the clockwise rotation, while by "−" in the counterclockwise rotation provided that the short side orientation corresponds to 0°. The term "back face side" means the side opposite to the viewing side of the display of the liquid crystal display module. The term "retardation value Re" is a value calculated according to the formula: Re=(ny−nx)d. The term "low-retardation film" refers to a film having an absolute retardation value of equal to or less than 60 nm.

As in the foregoing, the optical sheet provided in the liquid crystal display module of the present invention has a function to actively convert the polarization components of the rays of light outgoing from the backlight front face into the transmission axial orientation of the polarizing plate. Accordingly, the liquid crystal display module of the present invention having such an optical sheet markedly enhances utilization efficiency of the rays of light emitted from the lamp, and thus, high-luminance, energy-saving, and thin and light modeling which have been socially demanded these days can be facilitated.

BRIEF DESCRIPTION OF THE DRAWINGS

FIG. 3 shows a schematic perspective view illustrating a method of measuring polarization anisotropy of outgoing rays of light of an optical waveguide plate or the like.

FIG. 4 shows a graph illustrating results of measuring polarization anisotropy of outgoing rays of light of the optical waveguide plate or the like.

FIG. 5 shows a graph illustrating the results of measuring a polarizing characteristic of outgoing rays of light of the optical waveguide plate or the like.

FIGS. 6(a) and (b) show a graph illustrating results of simulation and experimental determination of the relationship between the angle ψ and the average intensity of transmitted beam $I_A$.

FIGS. 8(a) and (b) show a schematic plan view and a schematic cross-sectional view illustrating an optical sheet (microlens sheet) with a mode which is different from the optical sheet provided in the liquid crystal display module shown in FIG. 1.

DESCRIPTION OF THE PREFERRED EMBODIMENTS

Hereinafter, embodiments of the present invention will be described in detail with appropriate references to the drawing.

Figure 1:
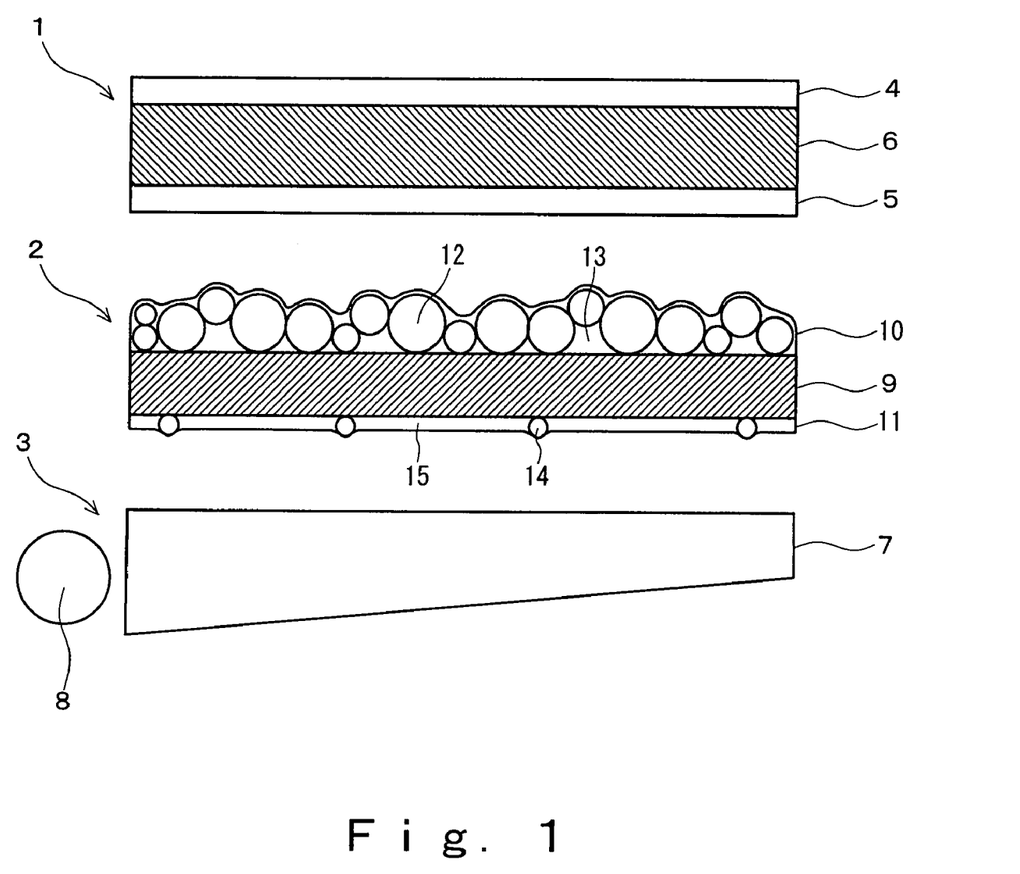
FIG. 1 shows a schematic cross sectional view illustrating a liquid crystal display module according to one embodiment of the present invention.

Liquid crystal display module shown in FIG. 1 has a liquid crystal display element 1, an optical sheet 2 and a backlight 3. The liquid crystal display element 1, the optical sheet 2 and the backlight 3 (light-outcoming face) have a substantially same and rectangular shape in plan, and they are superposed in this order from the front face side to the back face side.

The liquid crystal display element 1 has a front face side-polarizing plate 4 and a back face side-polarizing plate 5 which are disposed in a substantially parallel manner with a certain interval, and a liquid crystal cell 6 sandwiched therebetween. The polarizing plates 4, 5 are not particularly limited, but generally constructed with polarizers such as an iodine-based polarizer, a dye-based polarizer and a polyene-based polarizer, and two pieces of transparent protective films disposed on both sides of the same. The front face side-polarizing plate 4 and the back face side-polarizing plate 5 are disposed such that both transmission axial orientations became orthogonal each other.

The liquid crystal cell 6 has a function to control the amount of transmitted light, and any of a variety of known ones may be employed. The liquid crystal cell 6 has generally a layer structure constituted with a basal plate, a color filter, a counter electrode, a liquid crystal layer, a pixel electrode, and a basal plate. For this pixel electrode, transparent conductive film such as ITO or the like may be used. As a display mode of the liquid crystal cell 6, for example, TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), HAN (Hybrid Aligned Nematic) or the like proposed hitherto may be used.

The backlight 3 is a surface illuminant apparatus of an edge light type (also referred to as side light type), and illuminates the liquid crystal display element 1 from the back face side thereby allowing for light emission. Specifically, the backlight 3 is equipped with a square platy optical waveguide plate 7 having a substantially wedge-shaped cross sectional shape in which one end face (light entrance face) side is thick while the opposing end face side is thin, a rod-shaped lamp 8 disposed along the light entrance face of the optical waveguide plate 7, a reflection sheet disposed on the back face side of the optical waveguide plate 7 (not shown in the Figure), a reflector disposed so that it laterally surrounds the lamp 8 (except for the light entrance face side of the optical waveguide plate 7), a light reflection film adhered on the end face opposing to the light entrance face of the optical waveguide plate 7, a casing having a top opening for placing these constituents, and the like, and is constructed such that the rays of light emitted from the lamp 8 are allowed to outgo from the entire front face of the optical waveguide plate 7. In addition, in order to direct the outgoing rays of light toward the orientation along the normal line orientation, a backlight 3 having a construction in which a prism optical waveguide plate having triangle pole-shaped prism parts formed in multiple streaks (in stripe) perpendicularly to the lamp 8 on the back face is used as the optical waveguide plate 7, and an inverse prism sheet having triangle pole-shaped prism parts formed in multiple streaks and in parallel to the lamp 8 on the back face is superposed on the front face side of the optical waveguide plate 7 was also proposed.

The optical sheet 2 is a light diffusion sheet that has a light spread function to allow transmitted rays of light to be diffused (particularly, directional spread function to permit light condensing to the normal line orientation side while allowing to be diffused). The optical sheet 2 has specifically, a substrate film 9, an optical layer (light diffusion layer) 10 overlaid on the front face of the substrate film 9, and a sticking preventive layer 11 overlaid on the back face of the substrate film 9.

The substrate film 9 is a film made of a resin formed into a rectangular shape. As a material for forming the substrate film 9, a transparent, particularly colorless and transparent, synthetic resin is used. This synthetic resin is not particularly limited, and examples thereof include e.g., polyethylene terephthalate, polyethylene naphthalate, acrylic resins, polycarbonate, polystyrene, polyolefin, cellulose acetate, weather resistant vinyl chloride and the like. Among them, polyethylene terephthalate or polycarbonate that is highly transparent, has high strength, and the retardation value of which can be readily regulated as described later is preferred. Particularly, polyethylene terephthalate having improved flexural performance is preferred.

Thickness of the substrate film 9 (average thickness) is not particularly limited, but is preferably 10 μm or greater and 250 μm or less, particularly preferably 20 μm or greater and 188 μm or less. When the substrate film 9 has a thickness being below the above range, disadvantages such as increasing possibility of generation of curling upon coating a polymer composition for forming the light diffusion layer or the like, and difficulty in handling, and the like may be caused. To the contrary, when the substrate film 9 has a thickness being beyond the above range, luminance of the liquid crystal display module may be lowered, and further may result in increase of thickness of the backlight 3, leading to production of a liquid crystal display module which does not fulfill the demand for thin modeling.

The substrate film 9 has an optical anisotropy, and specifically, has a birefringence exhibiting different refractive indices in the horizontal orientation. This birefringence enables the substrate film 9 to convert the polarization components of the transmitted rays of light into an intended orientation.

The substrate film 9 has an optimized crystallographic axial orientation and retardation value. The angle α of the crystallographic axial orientation and the retardation value of the substrate film 9 will be explained below by way of experimental measurement and simulation.

Figure 3:
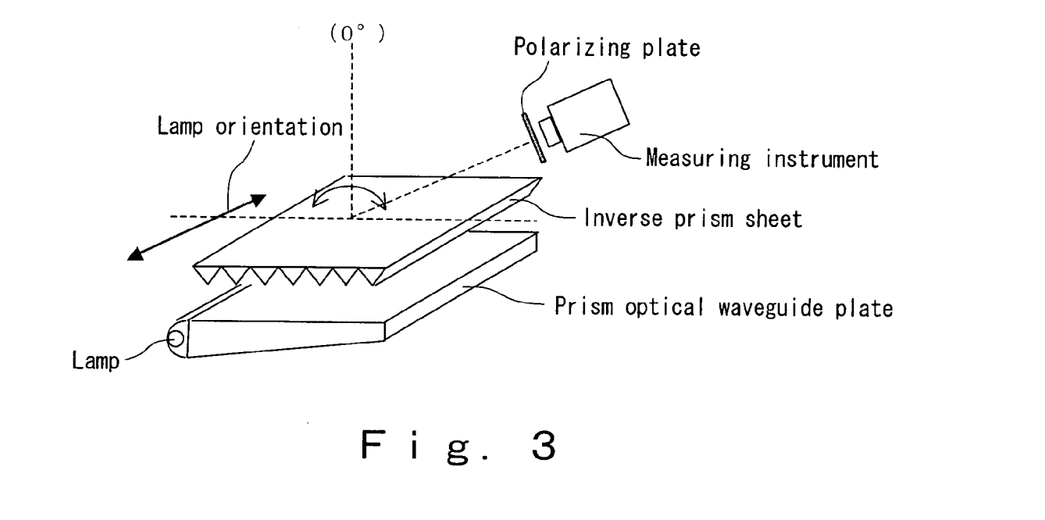

Determination of Anisotropy of Polarization Intensity of Rays of Light Outgoing from Optical Waveguide Plate or the like As shown in FIG. 3, in case of the edge light type backlight having a construction of A: a prism optical waveguide plate alone; and B: a prism optical waveguide plate and an inverse prism sheet being superposed, measurement of the luminance of the angular field of view in vertical orientation to the lamp orientation was conducted. Upon the measurement, angle of the polarizing filter of the measuring instrument was regulated to measure:

(1) polarization components in vertical orientation to the lamp (transmission axis of the polarizing plate filter of the measuring instrument being vertical), and (2) polarization components in parallel orientation to the lamp (transmission axis of the polarizing plate filter of the measuring instrument being parallel). The results are shown in FIG. 4.

Figure 4:
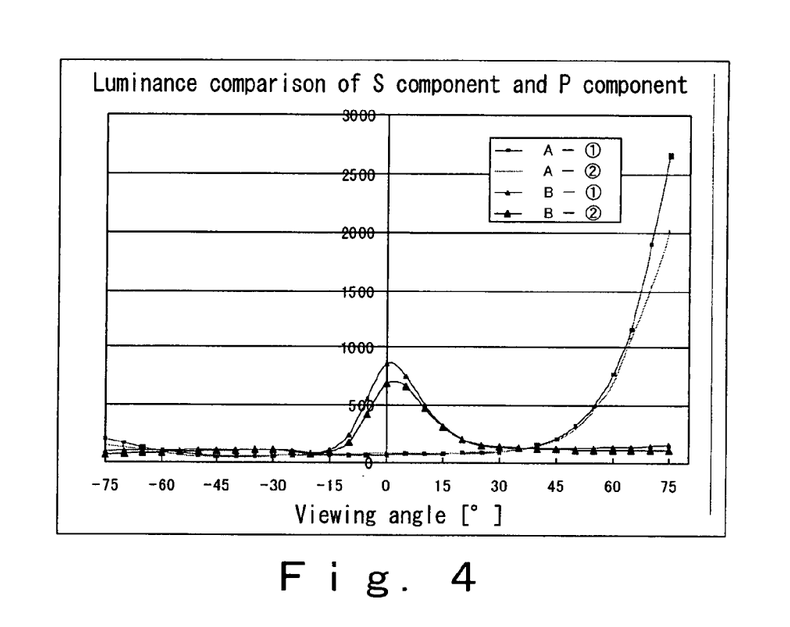

As shown in FIG. 4, in case of A, i.e., when the prism optical waveguide plate alone was incorporated, an outgoing light characteristic was exhibited showing polarization anisotropy being high at approximately 60° to 75° with a large amount of the outgoing light; and showing the polarization components being rich in the vertical orientation to the lamp. Moreover, in case of B, i.e., use of the prism optical waveguide plate and the inverse prism sheet, an outgoing light characteristic was exhibited: showing the polarization anisotropy being high at approximately 0° in the front orientation; and showing the polarization components being rich in the vertical orientation to the lamp.

Verification of Polarizing Characteristics of Rays of Light Outgoing from Optical Waveguide Plate or the like Polarizing characteristics of the rays of light outgoing from the backlight having the construction including the optical waveguide plate and the inverse prism sheet as shown in FIG. 3 were verified, and compared with the backlight including the normal optical waveguide plate alone. An angle of the orientation that is vertical to the orientation of the lamp was supposed to be 0°, and the polarizing plate was laminated on the backlight. Then, transmission axis of this polarizing plate was rotated in 10-degree steps from the position of 0°, and the front luminance data were determined. Also, the backlight having the normal optical waveguide plate alone was similarly subjected to the determination. The results are shown in FIG. 5.

Figure 5:
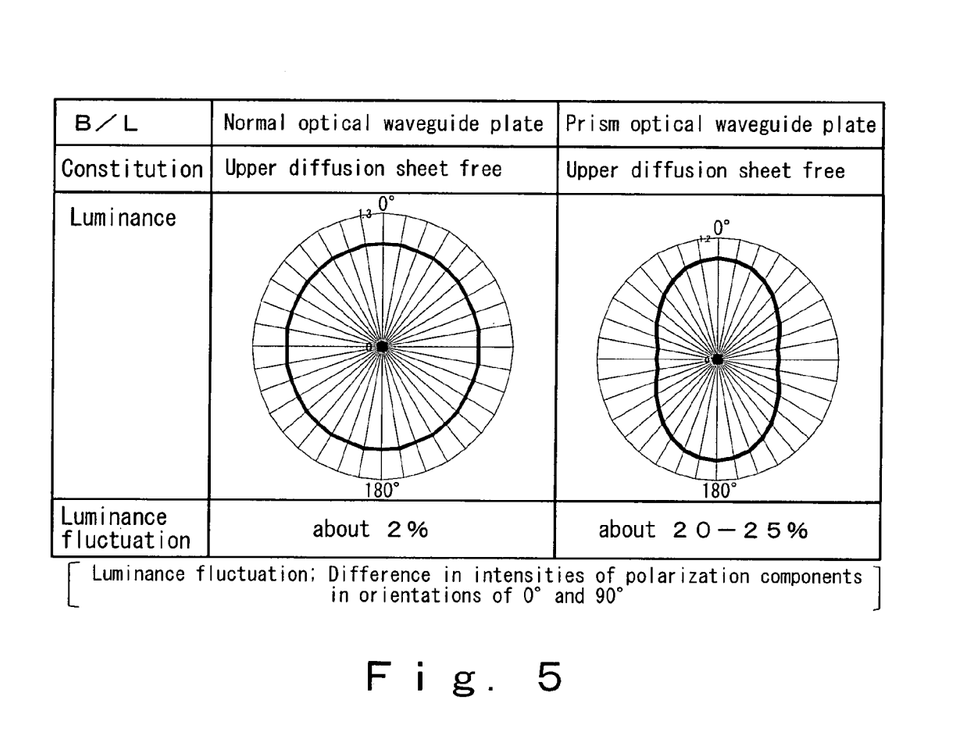

As shown in FIG. 5, in comparison with the construction including the normal optical waveguide plate alone, great polarization was verified in the polarization components in both vertical and parallel orientations to the lamp, according to the construction including the prism optical waveguide plate and the inverse prism sheet. Specifically, in the backlight having the construction including the prism optical waveguide plate and the inverse prism sheet, polarization of the polarization components was greater by about 20% for the components in the vertical orientation to the lamp as compared with the components in the parallel orientation.

Simulation of Optimization of Crystallographic Axial Angle and Phase Contrast

On the basis of the aforementioned measurement results, calculation of an optimum value of the crystallographic axial angle α of the substrate film 9 and phase contrast is carried out for efficiently converting the polarization orientation of the rays of light outgoing from the optical waveguide plate or the like into the transmission axial orientation of the polarizing plate.

Figure 2:
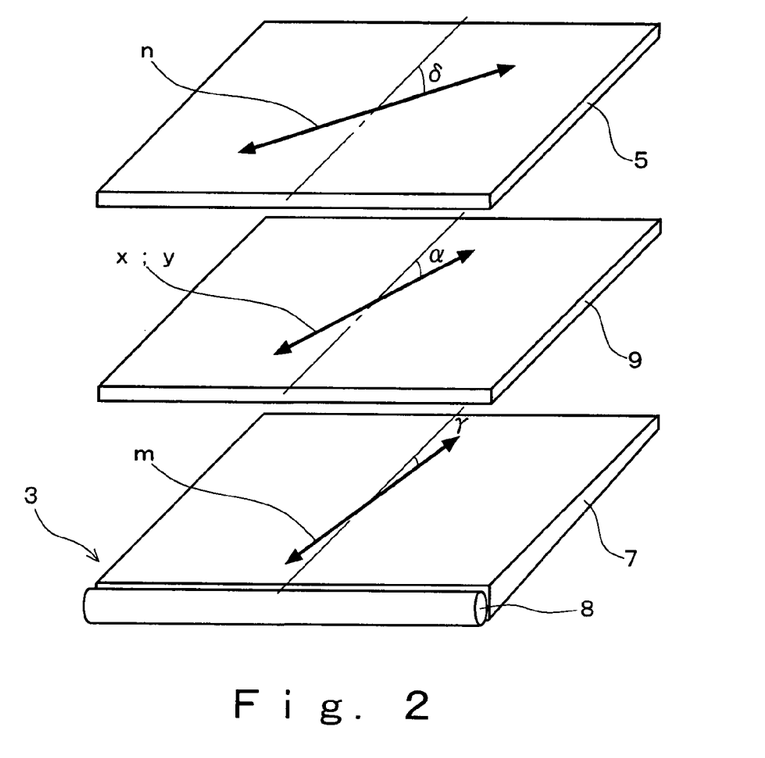
FIG. 2 shows a schematic perspective view illustrating a relationship between the transmission axial orientation of the back face side-polarizing plate, the crystallographic axial orientation of the substrate film, and the polarization orientation of the backlight in the liquid crystal display module shown in FIG. 1.

As shown in FIG. 2, in the liquid crystal display module, provided that: with respect to the short side orientation as a base, angle of the polarization orientation m of the rays of light outgoing from the front face of the backlight 3 is designated as γ; and angle of the transmission axial orientation n of the back face side-polarizing plate 5 is designated as δ, the angle ε of the crystallographic axial orientation (x, y) of the substrate film 9 that is most suitable for allowing the polarization orientation m of the outgoing rays of light of the backlight 3 to be converted into the transmission axial orientation n of the back face side-polarizing plate 5 may be calculated by the following mathematical formula (I) and mathematical formula (II):

$$\epsilon = \gamma + (\delta - \gamma)/2 \text{ in the case of } \gamma \leq \delta; \text{ and} \quad (I)$$

$$\epsilon = \delta + (\gamma - \delta)/2 \text{ in the case of } \gamma \geq \delta. \quad (II)$$

Furthermore, when a polarizer P is disposed on one face side of the substrate film 9 and an analyzer Q is disposed on another face side of the same, and thus the linear polarized light that passed through the polarizer P (amplitude=1, intensity of transmitted beam=1) transmits the substrate film 9 and then pass through the analyzer Q, provided that the phase advancing axial orientation and phase retarding axial orientation of the crystallographic axial orientation of the front face of the substrate film 9 is designated as x orientation and y orientation, respectively; the thickness of the substrate film 9 is designated as d; refractive index in the x orientation and the y orientation is designated as nx and ny (nx≠ny), respectively; angle formed by the crystallographic axial orientation and the transmission axial orientation of the polarizer P is designated as ψ; and angle formed by the transmission axial orientation of the polarizer P and the transmission axial orientation of the analyzer Q is designated as β, transition of the light passed through the analyzer Q is represented by the following mathematical formula (1); intensity of transmitted beam is represented by the following mathematical formula (2); and average intensity of transmitted beams $I_A$ at three wavelengths of RGB is represented by the following mathematical formula (3):

$$E(d,t) = \sin\phi\cos\Theta(d,t)\sin(\beta+\phi) + \cos\phi\cos\{\Theta(d,t) + \delta(d)\}\cos(\beta+\phi) \quad (1)$$

$$I = (1/T_0)\int_0^{T_0} E^2 dt \quad (2)$$

$$I_A = (I_1 + I_2 + I_3)/3 \quad (3)$$

wherein, λ is wavelength; c is light velocity; t is time; k is 2π/λ; Θ(d,t) is k(nxd−ct); and δ(d) is k(ny−nx)d. $I_1$, $I_2$ and $I_3$ are intensity of transmitted beam of the light passed through the analyzer Q at a wavelength of the incident light of the polarizer P of $\lambda_1$: 430 nm, $\lambda_2$: 550 nm and $\lambda_3$: 610 nm, respectively Optimum Crystallographic Axial Angle α

From the aforementioned results, the polarization orientation m of the rays of light generally outgoing from the edge light type backlight front face follows the vertical orientation to the orientation of the lamp 8, while the transmission axial orientation n of the back face side-polarizing plate 5 in the liquid crystal display module is ±π/4 with respect to the vertical orientation to the orientation of the lamp 8. Therefore, in the above mathematical formulae (1), (2) and (3), β was assigned as π/4, and Re was assigned as λ/2. Accordingly, relationship between ψ and the average intensity of the transmitted beam $I_A$ was determined. The results are shown in FIG. 6(a).

Judging from the experimental results shown in FIG. 6(a) and "Relationship between Angle α of Crystallographic Axial Orientation with respect to Short Side Orientation and Front Luminance" described later, when the angle δ of the polarization orientation m of the backlight 3 is 0°, and the angle δ of the transmission axial orientation n of the back face side-polarizing plate 5 is ±π/4, absolute value of the angle α of the crystallographic axial orientation (x, y) of the substrate film 9 with respect to the short side orientation is preferably π/16 or greater and 3π/16 or less, particularly preferably 3π/32 or greater and 5π/32 or less, and most preferably π/8. Specification of the angle α of the crystallographic axial orientation in terms of the absolute value as described above was conducted because there may be a case in which the transmission axial orientation of general polarizing plates is ±π/4 with respect to the vertical orientation to the lamp orientation.

From the foregoing results, when the angle γ of the polarization orientation m and the angle δ of the transmission axial orientation n are not specified in liquid crystal display modules, the angle α of the crystallographic axial orientation (x, y) of the substrate film 9 falls within the range of preferably ±50% of the value ε calculated by the above mathematical formula (I) and mathematical formula (II) (from 0.5×ε or greater and 1.5×ε or less), and particularly preferably within the range of ±25% (from 0.75×ε or greater and 1.25×ε or less). By thus making the angle α of the crystallographic axial orientation (x, y) of the substrate film 9 to fall within the above range, the polarization components of the rays of light outgoing from the backlight 3 front face can be converted into the transmission axial orientation of the back face side-polarizing plate 5 or the reflection polarizing plate.

Figure 6:
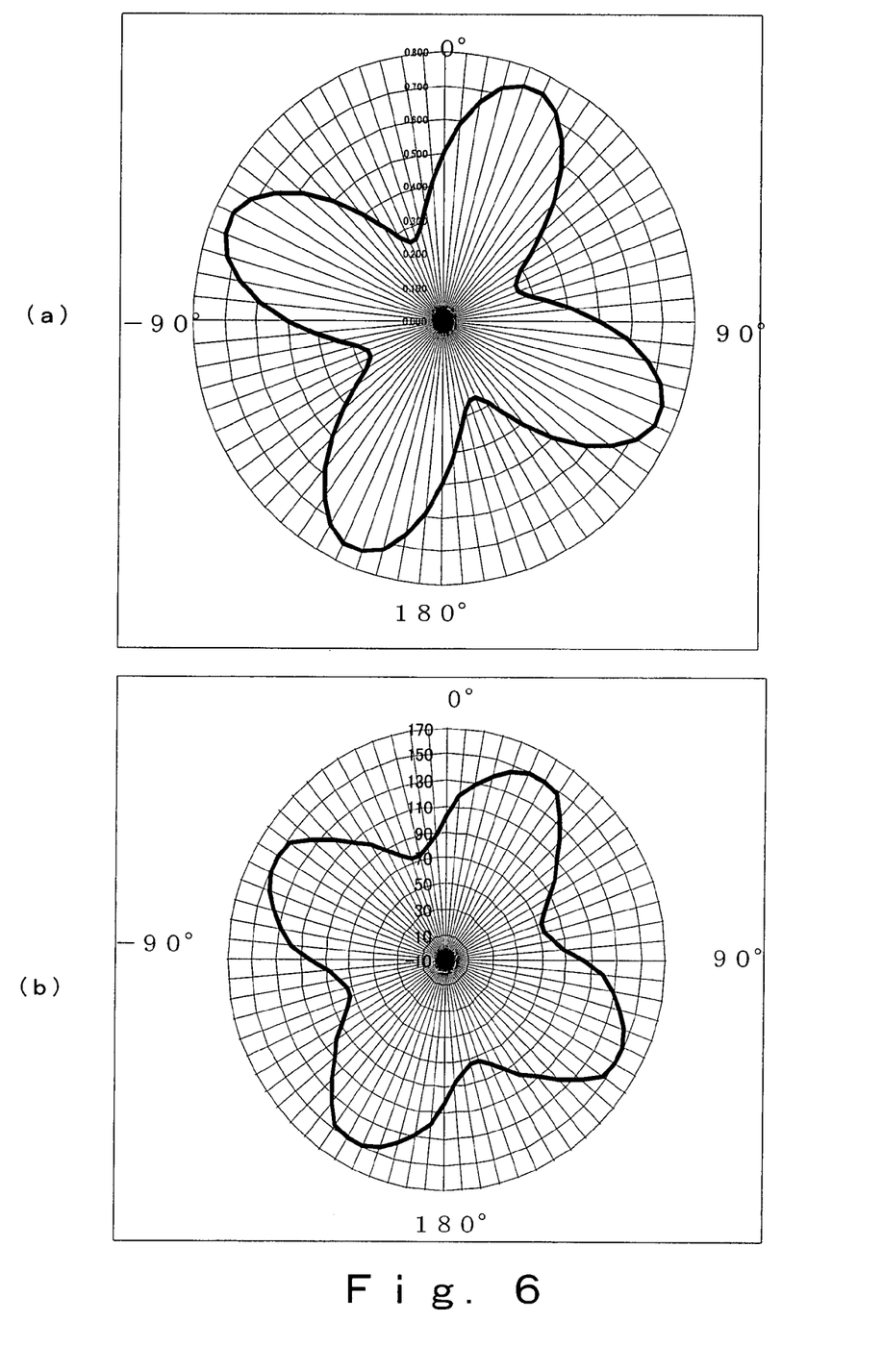

In addition, using the substrate film 9 having a retardation value of 320, followed by laminating this substrate film 9 on the backlight having the construction including the optical waveguide plate and the inverse prism sheet, the front luminance was measured while rotating the crystallographic axis. Relationship of thus resulting crystallographic axial angle and the front luminance is shown in FIG. 6(*b*). The relationship between the crystallographic axial angle and the front luminance shown in FIG. 6(*b*) indicates consistency with the relationship between the angle ψ and the average intensity of transmitted beam $I_A$ shown in FIG. 6(*a*). Accordingly, it was revealed that simulation of the crystallographic axial angle described above was properly performed.

Optimum Retardation Value

Based on the aforementioned measurement results and simulation results, relationship between the average intensity of transmitted beam $I_A$ and the retardation value was determined when disposed at optimum angles β being π/4, and ψ being −(β/2). The results are shown in FIG. 7.

Figure 7:
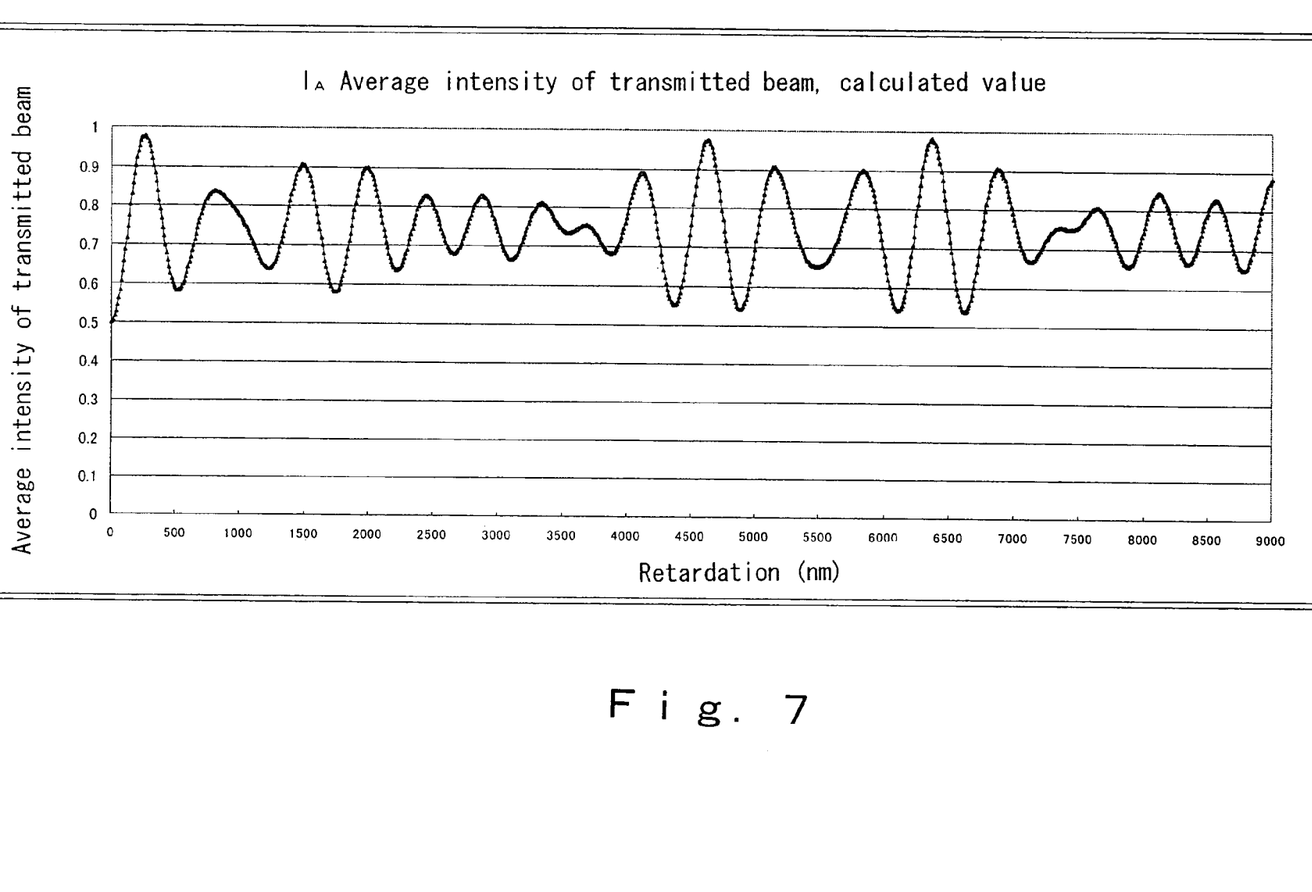
FIG. 7 shows a graph illustrating results of simulation of the relationship between the retardation value and the average intensity of transmitted beam $I_A$.

Judging from FIG. 7, in the substrate film 9, the retardation value to yield the average intensity of transmitted beam $I_A$ of 0.75 or greater is preferred; the retardation value to yield the average intensity of transmitted beam $I_A$ of 0.9 or greater is more preferred; and the retardation value to yield the average intensity of transmitted beam $I_A$ of 0.95 or greater is particularly preferred.

Specific retardation value in the substrate film 9 is, judging from FIG. 7 and the experimental results in "Relationship between Retardation Value and Front Luminance" described later: preferably 140 nm or greater and 390 nm or less to yield the average intensity of transmitted beam $I_A$ Of equal to or greater than 0.75, particularly preferably 190 nm or greater and 330 nm or less to yield the average intensity of transmitted beam $I_A$ of equal to or greater than 0.9, and further, particularly preferably 240 nm or greater and 280 nm or less to yield the average intensity of transmitted beam $I_A$ of equal to or greater than 0.95. By setting the retardation value to fall within such a range, the polarization components of the rays of light outgoing from the optical waveguide plate or the like can be effectively converted into the transmission axial orientation of the polarizing plate or the like, and ease in production of the substrate film 9 can also be favorable. Also, in the case of the retardation value being 680 nm or greater and 1040 nm or less, otherwise 1350 nm or greater and 1610 nm or less, and the like, the average intensity of transmitted beam $I_A$ will be equal to or greater than 0.75, whereby utilization efficiency of the rays of light can be improved by the polarizing function of the back face side-polarizing plate 5 toward the transmission axial orientation.

The aforementioned crystallographic axial orientation preferably follows the phase advancing axial orientation. Decision of the angle α with respect to the short side orientation of the crystallographic axial orientation x, y of the substrate film on the basis of the phase advancing axial orientation can improve the utilization efficiency of the rays of light to some extent, and thus can improve the luminance of the backlight than the decision thereof on the basis of the phase retarding axial orientation. This was demonstrated by the experimental results in the "Relationship between Phase Advancing Axial Orientation or Phase Retarding Axial Orientation, and Front Luminance" described later.

Process for producing the substrate film 9 is not particularly limited as long as the crystallographic axial angle α and the retardation value can be regulated to fall within the above numerical range. For example, the crystallographic axial angle α can be regulated to fall within the range according to the present invention by adjusting stretching force, temperature and the like in the processing of uniaxial stretching of polyethylene terephthalate or the like, as well as by adjusting the position and angle of punching in the processing of punching of the biaxially stretched film. Moreover, the retardation value can be regulated by way of stretching force, temperature, film thickness or the like in the processing of stretching.

The substrate film 9 can convert the polarization components of the rays of light outgoing from the optical waveguide plate (or inverse prism sheet laminated on the optical waveguide plate front face) into the transmission axial orientation of the polarizing plate or the reflection polarizing plate. Hence, components of the light conventionally reflected for recycling can be transmitted efficiently to improve the utilization efficiency of the rays of light.

The optical layer 10 includes multiple particles of a light diffusing agent 12 provided over the front face of the substrate film 9 in a substantially uniform manner, and a binder 13 for the multiple particles of the light diffusing agent 12. The multiple particles of the light diffusing agent 12 are covered by the binder 13. The multiple particles of the light diffusing agent 12 included in the optical layer 10 in such a manner enable uniform diffusion of the rays of light which transmit the optical layer 10 from the back side to the front side. Moreover, micro recessions and protrusions are formed on the surface of the optical layer 10 in a substantially uniform manner by the multiple particles of the light diffusing agent 12. Owing to a refracting action of the micro recessions and protrusions like a lens thus formed on the front face of the optical sheet 2, the rays of light can be more efficiently diffused. Although the average thickness of the optical layer 10 is not particularly limited, it may be, for example, approximately 1 μm or greater and 30 μm or less.

The light diffusing agent 12 may be in the form of particles having a property to allow the rays of light to be diffused, and its candidates can be generally classified into inorganic fillers and organic fillers. Examples of the inorganic filler which may be used include e.g., silica, aluminum hydroxide, aluminum oxide, zinc oxide, barium sulfide, magnesium silicate, or any mixtures thereof. Examples of the material which may be used for the organic filler include e.g., acrylic resins, acrylonitrile resins, polyurethane, polyvinyl chloride, polystyrene, polyacrylonitrile, polyamide and the like. Among them, acrylic resins having high transparency are preferred, and in particular, polymethyl methacrylate (PMMA) is preferred.

Shape of the light diffusing agent 12 is not particularly limited, and examples thereof include e.g., spherical, spindle, needle-like, rod-like, cubic, plate-like, squamous, fibrous and the like. In particular, the shape of spherical beads excellent in the light diffusibility is preferred.

The lower limit of the average particle size of the light diffusing agent 12 is preferably 1 μm, particularly preferably 2 μm, and still more preferably 5 μm. In contrast, the upper limit of the mean particle size of the light diffusing agent 12 is preferably 50 μm, particularly preferably 20 μm, and still more preferably 15 μm. When the mean particle size of the light diffusing agent 12 is below the above range, less recessions and protrusions are provided on the surface of the optical layer 10 formed by the light diffusing agent 12, involving the probability of unsatisfactory light diffusing property required for the light diffusion sheet. To the contrary, when the mean particle size of the light diffusing agent 12 is beyond the above upper range, thickness of the optical sheet 2 is increased, and uniform diffusion may be difficult.

It is preferred that the lower limit of the amount of the light diffusing agent 12 (incorporated amount per 100 parts of the substrate polymer in the polymer composition being the material for forming the binder 13, which is calculated on the basis of the solid content) be 10 parts, particularly 20 parts, and still more 50 parts, and that the upper limit of the incorporated amount be 500 parts, particularly 300 parts, and still more 200 parts. The amount of the incorporated light diffusing agent 12 below the above range may result in insufficient light diffusibility, while the amount of the incorporated light diffusing agent 12 beyond the above range, to the contrary, may result in deterioration of the effect of fixing the light diffusing agent 12. High light diffusibility is not required in case of so called light diffusion sheets for upper use disposed to the front face side of the prism sheet, therefore, the amount of the incorporated light diffusing agent 12 may be preferably 10 parts or greater and 40 parts or less, particularly preferably 10 parts or greater and 30 parts or less.

The binder 13 can be formed by allowing a polymer composition containing a substrate polymer to be crosslinked and cured. This binder 13 disposes and fixes the light diffusing agent 12 on the front face of the substrate film 9 in a manner to provide substantially uniform density. Furthermore, for example, a fine inorganic filler, a curing agent, a plasticizer, a dispersant, any of various levelling agents, an ultraviolet ray-absorbing agent, an anti-oxidizing agent, a viscosity improving agent, a lubricant, a light stabilizer and the like may be blended ad libitum in the polymer composition for forming the binder 13, in addition to the substrate polymer.

The aforementioned substrate polymer is not particularly limited, and examples thereof include e.g., acrylic resins, polyurethane, polyesters, fluorine based resins, silicone based resins, polyamide imide, epoxy resins, ultraviolet-curable resins and the like. One or two or more of these polymers may be used as a mixture. Particularly, a highly processable polyol that can be readily formed into the optical layer 10 by a means such as coating or the like is preferred as the substrate polymer. Furthermore, the substrate polymer per se which may be used for the binder 13 is preferably transparent, and particularly preferably transparent and colorless in light of improvement of the transmittivity of the rays of light.

Examples of the polyol include e.g., polyols obtained by polymerizing a monomer component including a hydroxyl group-containing unsaturated monomer, polyester polyols obtained under a condition with excessive hydroxyl groups present, and the like. These may be used alone or two or more of them may be used as a mixture.

Examples of the hydroxyl group-containing unsaturated monomer include (a) hydroxyl group-containing unsaturated monomers such as e.g., 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol, and crotonyl alcohol, and (b) hydroxyl group-containing unsaturated monomers obtained by a reaction of a dihydric alcohol or an epoxy compound such as e.g., ethylene glycol, ethylene oxide, propylene glycol, propylene oxide, butylene glycol, butylene oxide, 1,4-bis (hydroxymethyl)cyclohexane, phenylglycidyl ether, glycidyl decanoate or PRACCEL FM-1 (manufactured by Daicel Chemical Industries, Ltd.), with an unsaturated carboxylic acid such as e.g., acrylic acid, methacrylic acid, maleic acid, fumaric acid, crotonic acid or itaconic acid. The polyol can be manufactured by polymerizing one or two or more selected from these hydroxyl group-containing unsaturated monomers.

Moreover, the polyol can be also manufactured by polymerizing one or two or more ethylenic unsaturated monomers selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycidyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetone acrylamide, ethylene, propylene, isoprene and the like, with the hydroxyl group-containing unsaturated monomer selected from those in the above (a) and (b).

The polymer obtained by polymerizing the monomer component including the hydroxyl group-containing unsaturated monomer may have a number average molecular weight of 1000 or greater and 500000 or less, and preferably 5000 or greater and 100000 or less. Furthermore, the hydroxyl value may be 5 or greater and 300 or less, preferably 10 or greater and 200 or less, and more preferably 20 or greater and 150 or less.

The polyester polyol obtained under a condition with excessive hydroxyl groups being present can be manufactured by allowing a reaction of (c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol A, bis(hydroxymethyl)cyclohexane, hydroquinone bis(hydroxyethyl ether), tris(hydroxyethyl)isocyanurate or xylylene glycol with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which number of the hydroxyl groups in the polyhydric alcohol such as propanediol, hexanediol, polyethylene glycol, trimethylolpropane or the like is greater than number of the carboxy groups of the aforementioned polybasic acid.

Number average molecular weight of the polyester polyol obtained under the condition with excessive hydroxyl groups being present may be 500 or greater and 300000 or less, and more preferably 2000 or greater and 100000 or less. Additionally, the hydroxyl value may be 5 or greater and 300 or less, preferably 10 or greater and 200 or less, and more preferably 20 or greater and 150 or less.

The polyol for use as the substrate polymer of the polymer composition may be preferably an acryl polyol which is obtained by polymerizing the aforementioned polyester polyol, and a monomer component comprising the hydroxyl group-containing unsaturated monomer, and which has a (meth) acrylic unit or the like. The binder 13 including the polyester polyol or acryl polyol as the substrate polymer is highly weather-resistant, and yellowing of the optical layer 10 and the like can be suppressed. Either one of this polyester polyol or the acryl polyol may be used, alternatively, both of them may be used.

Number of the hydroxyl groups in the polyester polyol and the acryl polyol is not particularly limited as long as it is two or more per molecule, however, when the hydroxyl value in the solid content is equal to or less than 10, crosslinking points may be reduced and thus, film physical properties such as solvent resistance, water resistance, heat resistance, surface hardness and the like are liable to be decreased.

A fine inorganic filler may be included in the polymer composition that forms the binder 13. By thus including the fine inorganic filler in the binder 13, heat resistance of the optical layer 10, and in turn, of the optical sheet 2 may be improved. Inorganic matter that constitutes the fine inorganic filler is not particularly limited, but an inorganic oxide is preferred. The inorganic oxide is defined as any one of a variety of oxygen-containing metal compounds in which a metal element forms a three dimensional network predominantly via bonds with an oxygen atom. The metal element that constitutes the inorganic oxide is preferably an element selected from, for example, those in the group II-VI of the periodic table of the elements, and more preferably an element selected from those in the group III-V of the periodic table of the elements. Particularly, an element selected from Si, Al, Ti and Zr is preferred. Colloidal silica in which the metal element is Si is most preferred as the fine inorganic filler in terms of the effect to improve the heat resistance and uniform dispersibility. Also, the shape of the fine inorganic filler is not particularly limited, but may be an optional particle shape such as spherical, needle-like, plate-like, squamous, granular or the like.

The lower limit of the mean particle size of the fine inorganic filler is preferably 5 nm, and particularly preferably 10 nm. In contrast, the upper limit of the mean particle size of the fine inorganic filler is preferably 50 nm, and particularly preferably 25 nm. When the mean particle size of the fine inorganic filler is below the above range, surface energy of the fine inorganic filler becomes so high that aggregation or the like may be liable to occur. To the contrary, the mean particle size of the fine inorganic filler being beyond the above range may cause white turbidity due to the influences of the short-wavelength, leading to failure in completely maintaining the transparency of the optical sheet 2.

The lower limit of the amount of the fine inorganic filler (amount of the incorporated inorganic substance component alone) per 100 parts by weight of the substrate polymer is preferably 5 parts, and particularly preferably 50 parts calculated on the basis of the solid content. In contrast, the upper limit of the amount of the incorporated fine inorganic filler is preferably 500 parts, more preferably 200 parts, and particularly preferably 100 parts. When the amount of the incorporated fine inorganic filler is below the above range, the optical sheet 2 may not develop heat resistance enough, to the contrary, when the amount is beyond the above range, blending in the polymer composition may be difficult, which may result in lowering of the light transmissivity of the optical layer 10.

As the fine inorganic filler, one having an organic polymer fixed on the surface thereof may be used. By thus using the organic polymer-fixed fine inorganic filler, improvement of dispersibility in the binder 13 and affinity with the binder 13 may be contemplated. This organic polymer is not particularly limited with respect to the molecular weight, shape, composition, presence of the functional group and the like, but an arbitrary organic polymer may be used. Furthermore, in connection with the shape of the organic polymer, any arbitrary shape such as a straight, branched or crosslinked structure may be used.

Specific examples of the resin constituting the organic polymer include e.g., (meth)acrylic resins, polystyrene, polyvinyl acetate, polyolefin such as polyethylene and polypropylene, polyvinyl chloride, polyvinylidene chloride, polyesters such as polyethylene terephthalate, copolymers of the same as well as these resins partially modified with a functional group such as an amino group, an epoxy group, a hydroxyl group or a carboxyl group, and the like. Among them, those including an organic polymer which contains a (meth)acrylic unit such as a (meth)acrylic resin, a (meth)acryl-styrene based resin or a (meth)acryl-polyester based resin as an essential component are suited because of their film formation ability. On the other hand, resins having miscibility with the substrate polymer of the aforementioned polymer composition are preferred, therefore, one having the same composition as the substrate polymer included in the polymer composition is most preferred.

The fine inorganic filler may include an organic polymer within the fine particle. Accordingly, adequate softness and toughness can be imparted to the inorganic substance that is a core of the fine inorganic filler.

As the organic polymer, one containing an alkoxy group may be preferably used, with the content of the same being 0.01 mmol or greater and 50 mmol or less per gram of the fine inorganic filler to which the organic polymer was fixed. Such an alkoxy group can improve affinity with a matrix resin that constitutes the binder 13, and dispersibility in the binder 13.

The alkoxy group described above means an RO group bound to a metal element that forms the skeleton of the fine particle. R herein represents an alkyl group which may be substituted, and the RO group in the fine particle may be the same or different. Specific examples of R include methyl, ethyl, n-propyl, isopropyl, n-butyl and the like. It is preferred that a metal alkoxy group be used which includes the same metal as that constituting the fine inorganic filler. When the fine inorganic filler is colloidal silica, an alkoxy group including silicon as the metal may be preferably used.

Although percentage content of the organic polymer in the fine inorganic filler to which the organic polymer was fixed is not particularly limited, its content is preferably equal to or greater than 0.5% by weight and equal to or less than 50% by weight based on the fine inorganic filler.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 13. Accordingly, the fine inorganic filler and the matrix resin of the binder 13 are bound via a crosslinking structure, leading to excellent stability upon preservation, stain resistance, flexibility, weather resistance and the like. Furthermore, the resulting coated film can be glossy.

As the aforementioned substrate polymer, a polyol having a cycloalkyl group is preferred. By thus introducing a cycloalkyl group into the polyol as the substrate polymer constituting the binder 13, hydrophobicity of the binder 13 may be elevated to improve water repellency, water resistance and the like. Accordingly, deflection resistance, size stability and the like of the optical sheet 2 under high temperature and high humidity conditions can be improved. Additionally, basic film coating performances such as weather resistance, hardness, bulky feeling, solvent resistance and the like of the optical layer 10 may be improved. Moreover, affinity with the fine inorganic filler to which the organic polymer was fixed on the surface thereof, and uniform dispersibility of the fine inorganic filler may be further favorable.

The cycloalkyl group is not particularly limited, and examples thereof include e.g., cyclobutyl groups, cyclopentyl groups, cyclohexyl groups, cycloheptyl groups, cyclooctyl groups, cyclononyl groups, cyclodecyl groups, cycloundecyl groups, cyclododecyl groups, cyclotridecyl groups, cyclotetradecyl groups, cyclopentadecyl groups, cyclohexadecyl groups, cycloheptadecyl groups, cyclooctadecyl groups and the like.

The polyol having the cycloalkyl group is obtained by copolymerization of a polymerizable unsaturated monomer having a cycloalkyl group. Such a polymerizable unsaturated monomer having a cycloalkyl group is a polymerizable unsaturated monomer having at least one cycloalkyl group within the molecule. This polymerizable unsaturated monomer is not particularly limited, and examples thereof include e.g., cyclohexyl(meth)acrylate, methylcyclohexyl(meth)acrylate, tert-butylcyclohexyl(meth)acrylate, cyclododecyl(meth)acrylate and the like.

Also, isocyanate may be included as a curing agent in the polymer composition. By thus including the isocyanate curing agent in the polymer composition, even more rigid crosslinking structure is provided, thereby further improving the physical film properties of the optical layer 10. Similar substance to the polyfunctional isocyanate compound as described above may be used as the isocyanate. Among all, aliphatic isocyanate is preferred which prevents the coated film from yellowing.

Particularly, when the polyol is used as the substrate polymer, any one of hexamethylene diisocyanate, isophorone diisocyanate and xylene diisocyanate, or two or more thereof as a mixture may be used as the curing agent to be blended in the polymer composition. When such a curing agent is used, velocity of the curing reaction of the polymer composition is elevated, therefore, lowering of the velocity of the curing reaction due to the cationic antistatic agent can be sufficiently compensated even though a cationic substance that is responsible for dispersion stability of the fine inorganic filler is used as the antistatic agent. Also, elevation of the velocity of the curing reaction of the polymer composition is responsible for uniform dispersibility of the fine inorganic filler in the binder. As a consequence, the optical sheet 2 can markedly suppress deflection and yellowing due to heat, ultraviolet ray and the like.

Furthermore, an antistatic agent may be blended and kneaded in the polymer composition. Through forming a binder 13 from the polymer composition blended and kneaded with the antistatic agent in such a manner, the optical sheet 2 exerts an antistatic effect, thereby enabling the prevention of disadvantages resulting from electrification with static electricity such as attraction of dust, getting into a difficulty in overlaying with a prism sheet or the like, and the like. Moreover, although coating the antistatic agent on a surface results in stickiness or pollution of the surface, such negative effects may be reduced by blending and kneading it in the polymer composition. This antistatic agent is not particularly limited, and examples thereof which may be used include e.g., anionic antistatic agents such as alkyl sulfate, alkyl phosphate and the like; cationic antistatic agents such as quaternary ammonium salts, imidazoline compounds and the like; nonionic antistatic agents such as polyethyleneglycol based compounds, polyoxyethylene sorbitan monostearate esters, ethanol amides and the like; polymeric antistatic agents such as polyacrylic acid, and the like. Among them, cationic antistatic agents are preferred having comparatively strong antistatic effects, which may exert an anti-static effect by merely adding in a small amount.

The sticking preventive layer 11 includes multiple beads 14 disposed on the back face of the substrate film 9 in a scattered manner, and a binder 15 for the multiple beads 14. This binder 15 is also formed by crosslinking and curing a polymer composition which is similar to one for the binder 13 of the optical layer 10 as described above. Moreover, as the material for the beads 14, similar ones to the light diffusing agent 12 for the optical layer 10 may be used. In addition, the thickness of the sticking preventive layer 11 (the thickness of the binder 15 portion, at a part where the beads 14 are not present) is not particularly limited, however for example, it is set to be around 1 µm or greater and 10 µm or less.

The amount of the incorporated beads 14 is set to be relatively small. The beads 14 are dispersed in the binder 15 spacing apart with each other. In addition, protrusions are formed on the under surface of the optical sheet 2.at the parts where the beads 14 are present. Thus, when this optical sheet 2 is disposed to overlay the optical waveguide plate, the protruded portions of the beads 14 are brought into contact with the surface of the optical waveguide plate or the like, and thus contact of the entire surface of the back face of the optical sheet 2 with the optical waveguide plate or the like is avoided. Sticking between the optical sheet 2 and the optical waveguide plate is thereby prevented, leading to suppression of the lack in uniformity of the brightness of the window of a liquid crystal display module.

Next, process for producing the optical sheet 2 will be explained below. The process for producing the optical sheet 2 comprises: (a) a step of preparing a composition for the optical layer through admixing the light diffusing agent 12 with a polymer composition that constitutes the binder 13; (b) a step of overlaying and curing the polymer composition for the optical layer on the front face of the substrate film 9 to form the optical layer 10; (c) a step of preparing a composition for the sticking preventive layer through admixing beads 14 with a polymer composition that constitutes the binder 15; and (d) a step of overlaying and curing the composition for the sticking preventive layer on the back face of the substrate film 9 to laminate the sticking preventive layer 11. Means for overlay to laminate the composition for the optical layer and the composition for the sticking preventive layer on the substrate film 9 is not particularly limited, but, for example, coating in which a bar coater, a blade coater, a spin coater, a roll coater, a gravure coater, a flow coater, a spray, screen printing or the like is used may be employed.

The optical sheet 2 has an excellent light spread function (directional light diffusion function) due to the reflection and refraction at the interface of the light diffusing agent 12 included in the optical layer 10, and the refraction on the micro recessions and protrusions formed on the front face of the optical layer 10. In addition, the optical sheet 2 can actively convert the polarization components of the rays of light outgoing from the backlight 3 into the transmission axial orientation of the back face side-polarizing plate 5 by means of the substrate film 9. Therefore, the liquid crystal display module can markedly enhance utilization efficiency of the rays of light emitted from the lamp 8, and thus high-luminance and energy-saving modeling, as well as space-saving modeling can be facilitated.

In the liquid crystal display module, other optical sheet such as a light diffusion sheet, a prism sheet or the like can be provided, in addition to the optical sheet 2 between the liquid crystal display element 1 and the backlight 3. As the substrate film of this other optical sheet, a low-retardation film may be desirably used. By thus using a low-retardation film as the substrate film of the other optical sheet so as to prevent the conversion of the polarization orientation of the transmitted rays of light by the other optical sheet from, inhibition of the polarizing function of the optical sheet 2 to the transmission axial orientation of the back face side-polarizing plate 5, as described above, can be prevented.

Figure 8:
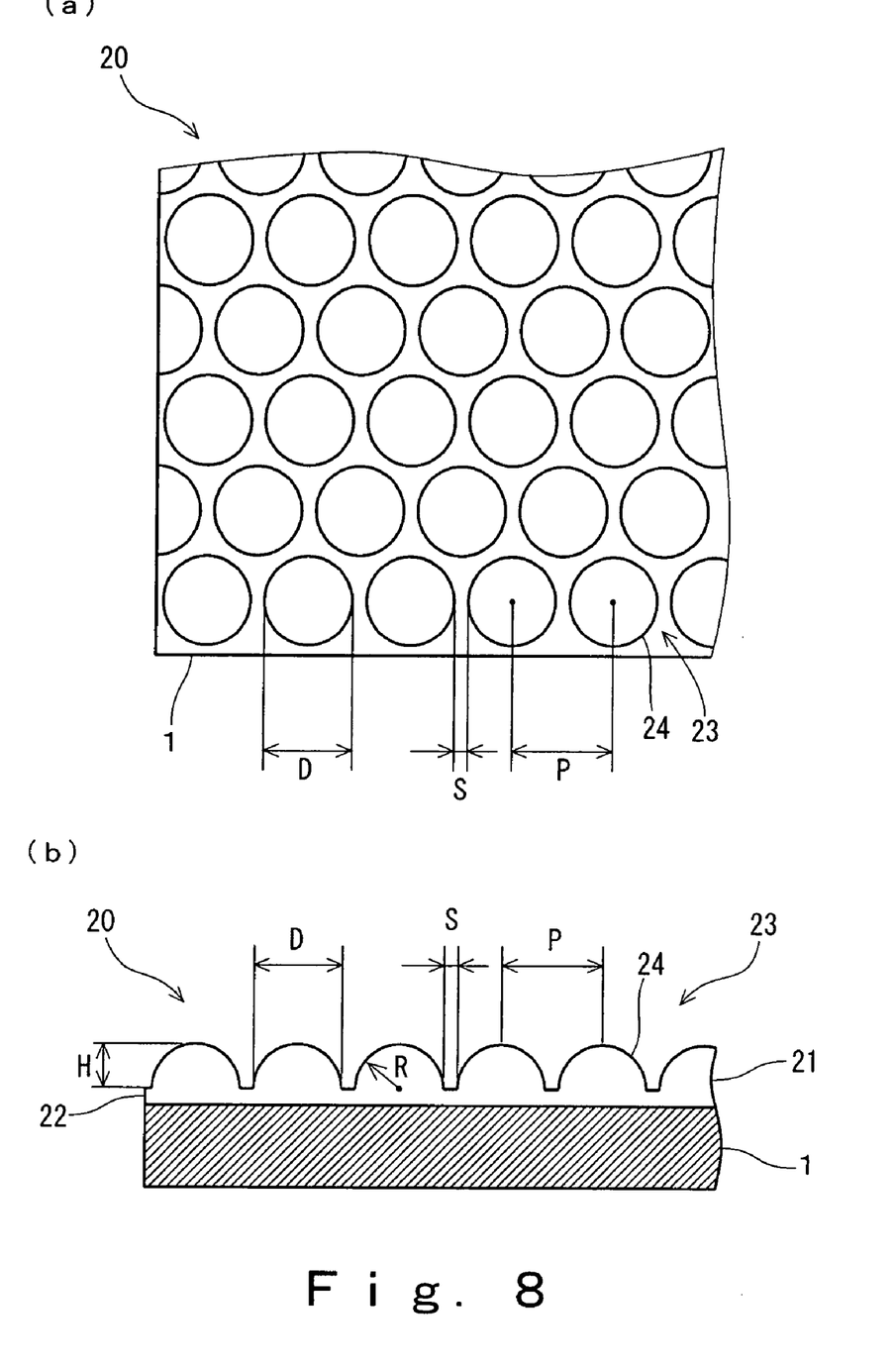

The liquid crystal display module may have an optical sheet 20 shown in FIG. 8 in place of the optical sheet 2. The optical sheet 20 is a so called microlens sheet having optical functions such as high light condensation, and refraction and diffusion toward the side of the normal line orientation. The optical sheet 20 has the substrate film 9, and an optical layer 21 laminated on the front face of the substrate film 9. Since the substrate film 9 of this optical sheet 20 is similar to the substrate film 9 of the optical sheet 2 described above, explanation will be omitted by referring to the identical numbers.

The optical layer 21 has a sheet-shaped part 22 overlaid on the front face of the substrate film 9, and a microlens array 23 formed on the front face of the sheet-shaped part 22. The optical layer 21 can be constructed with only the microlens array 23 without providing the sheet-shaped part 22. In other words, it is also possible to form the microlens array 23 directly on the front face of the substrate film 9.

The optical layer 21 is formed from a transparent, particularly, colorless and transparent synthetic resin, because transmission of rays of light is required. Examples of the synthetic resin which may be used for the optical layer 21 include e.g., polyethylene terephthalate, polyethylene naphthalate, acrylic resins, polycarbonate, polystyrene, polyolefin, cellulose acetate, weather resistant vinyl chloride, active energy beam curable resins, and the like. Among them, radiation curable resins such as ultraviolet ray curable resins, electron beam curable resins and the like being excellent in formability of the microlens array 23, as well as polyethylene terephthalate having excellent transparency and high strength are particularly preferred. In the optical layer 21 may be blended, for example, a filler, a plasticizer, a stabilizer, an antidegradant, a dispersant and the like, in addition to the aforementioned synthetic resin.

The microlens array 23 is constructed with a number of microlenses 24. The microlens 24 has a hemi-spherical shape (including the shape approximately to a hemisphere), and is provided to protrude on the front face side of the substrate film 9. The microlens 24 is not limited to the aforementioned hemi-spherical convex lens, but the microlens being a hemi-spherical concave lens is also acceptable. The microlens being the hemi-spherical concave lens also has excellent optical functions similarly to the microlens 24 as described above.

The microlenses 24 are arranged on the front face of the substrate film 9 in a comparatively dense and geometrical manner. Specifically, the microlenses 24 are arranged on the front face of the substrate film 9 in a regular triangular lattice pattern. Therefore, pitches (P) of the microlenses 24, and distances (S) between the lenses have entirely constant values, respectively. This arrangement pattern enables the microlenses 24 to be arranged in a most dense manner. The arrangement pattern of the microlenses 24 is not limited to the aforementioned regular triangular lattice pattern which enables dense filling but, for example, any of regular tetragonal lattice patterns and random patterns can also be employed. According to this random pattern, appearance of the moire can be reduced which may be caused when the optical sheet 20 overlaid on other optical member.

It is preferred that the lower limit of the diameter (D) of the microlens 24 is 10 μm, particularly 100 μm, and further particularly 200 μm. In contrast, the upper limit of the diameter (D) of the microlens 24 is preferably 1000 μm, and particularly preferably 700 μm. When the diameter (D) of the microlens 24 is smaller than 10 μm, diffraction may greatly affect to facilitate the occurrence of decrement of the optical performances and color separation, thereby leading to deterioration of the quality. To the contrary, when the microlens 24 has a diameter (D) of greater than 1000 μm, increase in the thickness and lack in uniformity of the luminance are liable to be caused, which may thereby lead to deterioration of the quality. In addition, by setting the diameter (D) of the microlens 24 to be equal to or greater than 100 μm, the microlenses 24 decrease in number per unit area. Consequently, enlargement of the planar dimension of the optical sheet 20 being the microlens sheet can be readily performed, and thus, technical and economic burdens in production can be reduced.

The lower limit of surface roughness (Ra) of the microlens 24 is preferably 0.01 μm, and particularly preferably 0.03 μm. In contrast, the upper limit of the surface roughness (Ra) of the microlens 24 is preferably 0.1 μm, and particularly preferably 0.07 μm. By thus setting the surface roughness (Ra) of the microlens 24 to be equal to or greater than the above lower limit, formation of the microlens array 23 of the optical sheet 20 is comparatively facilitated, and thus, technical and economic burdens in terms of the production can be reduced. To the contrary, by setting the surface roughness (Ra) of the microlens 24 to be less than the above upper limit, scattering of the light on the front face of the microlens 24 is decreased. Consequently, a light condensing function and a refraction function to the side of the normal line orientation by the microlens 24 are enhanced, and high luminance of the front orientation can be achieved resulting from such favorable optical functions.

The lower limit of the height ratio (H/R) of the height (H) of the microlens 24 to the height (R) of the curvature radius is preferably 5/8, and particularly preferably 3/4. In contrast, the upper limit of this height ratio (H/R) is preferably 1. By thus making the height ratio (H/R) of the microlens 24 fall within the above range, a lens-like refracting action in the microlens 24 is effectively exhibited, and the optical functions such as light condensation and the like of the optical sheet 20 can be markedly enhanced.

The upper limit of the spacing ratio (S/D) of the distance (S; P-D) between the lenses to the diameter (D) of the microlenses 24 is preferably 1/2, and particularly preferably 1/5. By thus setting the spacing ratio (S/D) of the microlens 24 to be equal to or less than the above upper limit, flat part which is not responsible for the optical functions can be decreased, and thus, the optical functions such as light condensation and the like of the optical sheet 20 can be markedly improved.

The lower limit of the filling rate of the microlens 24 is preferably 40%, and particularly preferably 60%. By thus setting the filling rate of the microlens 24 to be equal to or greater than the above lower limit, occupied area of the microlens 24 in the front face of the optical sheet 20 can be increased, and thus, the optical functions such as light condensation and the like of the optical sheet 20 can be markedly improved.

Numerical ranges of the aforementioned height ratio (H/R), spacing ratio (S/D) and filling rate were deduced on the basis of luminance analysis simulation by nonsequential tracing of the rays of light using a Monte Carlo method.

The lower limit of the refractive index of the material constituting the optical layer 21 is preferably 1.3, and particularly preferably 1.45. In contrast, the upper limit of the refractive index of this material is preferably 1.8, and particularly preferably 1.6. Within this range, the refractive index of the material constituting the optical layer 21 is most preferably 1.5. By thus making the refractive index of the material constituting the optical layer 21 fall within the above range, a lens-like refracting action in the microlens 24 is effectively exhibited, and the optical functions such as light condensation and the like of the optical sheet 20 can be further enhanced.

Process for producing the optical sheet 20 is not particularly limited as long as one having the constitution as described above can be formed, and any of various processes can be adopted. Specific examples of the process for producing the optical sheet 20 include those in the followings:

(a) a process for forming the optical sheet 20 by laminating a synthetic resin and the substrate film 9 in this order in a sheet mold having an inverted shape of the front face of the microlens array 23, and stripping off from the sheet mold;

(b) a process in which a resin formed into a sheet is heated again, which is sandwiched between a metal plate and a mold having an inverted shape of the front face of the microlens array 23, together with the substrate film 9, and then they are pressed to transfer the shape;

(c) an extrusion sheet forming process in which a molten resin and the substrate film 9 are passed through a nip between a roll mold having, on its inner circumference, an inverted shape of the front face of the microlens array 23 and another roll to transfer the shape;

(d) a process in which an ultraviolet ray curable resin is coated on the substrate film 9, pressed on a sheet mold, a mold or a roll mold having the inverted shape that is similar to the aforementioned one to transfer the shape to the uncured ultraviolet ray curable resin, and then the ultraviolet ray curable resin is exposed to an ultraviolet ray to permit curing;

(e) a process in which an uncured ultraviolet ray curable resin is filled for coating in a mold or a roll mold having the inverted shape that is similar to the aforementioned one, pressing it with the substrate film 9 to be uniform, and then the ultraviolet ray curable resin is exposed to an ultraviolet ray to permit curing;

(f) a process in which an uncured (liquid) ultraviolet ray curable resin or the like is sprayed or discharged from a minute nozzle such that the microlenses 24 are formed on the substrate film 9, and is then cured;

(g) A process in which an electron beam curable resin is used in place of the ultraviolet ray curable resin in the above processes (d) to (f), and the like.

In the method of manufacturing the mold having an inverted shape of the microlens array 23, it can be manufactured by, for example: producing a microlens array model through forming a patchy spatial pattern with a photoresist material on a substrate and subjecting this spatial pattern to heat fluidization to thereby make a curved face; laminating a metal layer on the front face of this microlens array model by electroforming; and peeling off this metal layer. Also, as the process for producing the aforementioned microlens array model, a process described in the above item (f) can be employed.

According to the method of the manufacture as described above, the microlens array 23 having an arbitrary shape is formed in an easy and accurate manner. Therefore, the diameter (D), the height ratio (H/R), the spacing ratio (S/D), the filling rate and the like of the microlenses 24 constructing the microlens array 23 can be regulated in an easy and accurate manner. As a result, the optical functions of the optical sheet 20 can be controlled in an easy and accurate manner.

The optical sheet 20 has optical functions such as high light condensation, refraction to the normal line orientation, diffusion and the like by means of the microlens array 23. In addition, the optical functions can be controlled in an easy and accurate manner. Moreover, the optical sheet 20 can actively convert the polarization components of the rays of light outgoing from the backlight 3 into the transmission axial orientation of the back face side-polarizing plate 5 by means of the substrate film 9. Therefore, the liquid crystal display module provided with the optical sheet 20 can also enhance utilization efficiency of the rays of light markedly, high-luminance and energy-saving modeling, as well as space-saving modeling in turn which have been socially demanded these days can be facilitated similarly to the liquid crystal display module provided with the optical sheet 2 described above. Additionally, when other optical sheet such as a light diffusion sheet is provided in the liquid crystal display module having the optical sheet 20, a low-retardation film may be desirably used as the substrate film of the other optical sheet.

The term "microlens" referred to above means a minute lens having a partial spherical surface at the interface, and pertinent examples thereof include e.g., hemispherical convex lenses, hemispherical concave lenses and the like. The term "diameter (D)" herein means a diameter of the microlens at its base or opening. The term "height (H)" herein means a distance in a vertical direction from the basal plane to the top of the microlens in case of the microlens being a convex lens, and a distance in a vertical direction from the opening to the bottom of the microlens in case of the microlens being a concave lens. The term "distances between the lenses" herein means the shortest distance between a pair of adjacent microlenses. The term "filling rate" herein means a ratio of the area of the microlenses per unit area in the projection shape of the front face. The term "regular triangular lattice pattern" herein means a pattern generated by dividing the front face into regular triangular compartments having the same shape, and arranging the microlenses at each vertex of the regular triangle.

The liquid crystal display module of the present invention is not limited to the foregoing embodiments. For example, the backlight is not limited to the aforementioned edge light type backlight, but other one such as an immediate beneath type or the like may be also employed.

The optical layer of the optical sheet having the polarizing function of the back face side-polarizing plate to the transmission axial orientation described above is not limited to the light diffusion layer shown in FIG. 1 and the micro lens array shown in FIG. 8, but can be constructed to provide a shape with micro recessions and protrusions having refractivity such as, for example, multiple triangle pole-shaped prism parts, cylindrical lens parts or the like arranged in stripes. In other words, the substrate film 9 as described above may be used as a substrate film of, for example, the prism sheet, the lens sheet or the like, whereby the polarizing function of the transmitted rays of light can be also effected by the prism sheet or the like. Moreover, on the optical sheet provided in the liquid crystal display module may be laminated other layer such as an ultraviolet ray absorbing agent layer, a top coat layer or the like.

The microlens constructing the aforementioned microlens array may be formed into a partial shape of an ellipsoid whose long axis is directed to the normal line orientation. According to the microlens having a partial shape of an ellipsoid whose long axis is directed to the normal line orientation, spherical aberration, in turn, loss of the rays of light can be reduced, and optical functions such as a light condensing function to the front side, a diffusing function, a bending function to the normal line orientation and the like of the transmitted rays of light can be enhanced. Flat ratio ($R_L/R_S$) of the radius along the long axis ($R_L$) to the radius along the short axis ($R_S$) of this ellipsoid is preferably 1.05 or greater and 1.7 or less in an attempt to effectively reduce the spherical aberration of the microlens.

The microlens constructing the microlens array as described above may be also formed into a partial shape of an ellipsoid whose long axis is positioned approximately parallel to a certain horizontal orientation. According to the microlens having a partial shape of an ellipsoid whose long axis is positioned approximately parallel to a certain horizontal orientation, anisotropy is involved in the optical function, and specifically, the optical function in the vertical orientation to the long axis is enhanced than the optical function in the parallel orientation to the long axis of the microlens.

In connection with the aforementioned ultraviolet ray absorbing agent, in place of or together with the means to allow the agent to be included in the binder 13 of the optical layer 10 described above, an ultraviolet ray absorption layer containing the ultraviolet ray absorbing agent can be also laminated, alternatively, the ultraviolet ray absorbing agent may be allowed to be included in the binder 15 of the sticking preventive layer 11 or the substrate film 9. Also by such means, the ultraviolet ray emitted from the lamp of the backlight can be similarly cut off, and disruption of the liquid crystal layer by the ultraviolet ray can be prevented.

In connection with the aforementioned antistatic agent, in place of or together with the means to allow the agent to be included in the binder 13 of the optical layer 10 described above, an antistatic layer containing the antistatic agent can be also laminated, alternatively, means to include an antistatic agent in the binder 15 of the sticking preventive layer 11 or the substrate film 9 is can be applied. Also by such means, an antistatic effect may be similarly developed on the optical sheet, therefore, disadvantages caused due to electrification with static electricity such as collecting dusts with friction, difficulties in overlaying with other sheet such as a prism sheet or the like can be prevented.

EXAMPLES

Hereinafter, the present invention will be explained in detail by way of Examples, however, the present invention should not be construed as being limited to the description of these Examples.

Relationship between Angle α in Crystallographic Axial Orientation with Respect to Short Side Orientation and Front Luminance Light diffusion sheets were produced by: sampling at different positions from an original film obtained through biaxially stretching polyethylene terephthalate; producing rectangular substrate films having a variety of angles of the crystallographic axial orientation with respect to the short side orientation; and laminating a similar light diffusion layer thereon.

Front luminance was measured when these light diffusion sheets were incorporated in a liquid crystal module having the angle of the transmission axial orientation of the back face side-polarizing plate of the liquid crystal cell being 45° with respect to the lamp orientation. Relationship between the crystallographic axial angle α of the substrate film and the front luminance are presented in Table 1 below.

TABLE 1

| Crystallographic axial orientation angle α (rad) | Crystallographic axial orientation angle α (deg) | Front luminance (cd/m$^2$) |
| --- | --- | --- |
| 0 | 0 | 752 |
| π/16 | 11.25 | 925 |
| 3π/32 | 16.875 | 968 |
| π/8 | 22.5 | 984 |
| 5π/32 | 28.125 | 970 |
| 3π/16 | 33.75 | 926 |
| 2π/8 | 45 | 750 |
| 3π/8 | 67.5 | 521 |

As shown in Table 1, when the angle α of the crystallographic axial orientation with respect to the short side orientation of the substrate film was π/16 or greater and 3π/16 or less, high front luminance was developed, and fluctuation of the front luminance depending on the angle α was reduced. Moreover, when the angle α of this crystallographic axial orientation was 3π/32 or greater and 5π/32 or less, the fluctuation of the front luminance was suppressed to about 3% or less in addition to exhibiting favorable front luminance. Particularly, when the angle α of the crystallographic axial orientation was π/8, the highest front luminance was developed. In addition, also in cases in which the angle α of this crystallographic axial orientation was a negative value, a front luminance that was similar to the value described above was developed with a liquid crystal module having the angle of the transmission axial orientation of the back face side-polarizing plate of the liquid crystal cell being −45° with respect to the lamp orientation. Therefore, adequacy of the range of the angle α of the crystallographic axial orientation of the substrate film with respect to the short side orientation specified according to the present invention as described hereinabove was demonstrated.

Relationship between Retardation Value and Front Luminance

Substrate films having a variety of retardation values were produced by uniaxially stretching polyethylene terephthalate or polycarbonate. These substrate films were disposed in a liquid crystal module to give the angles of β being π/4 and ψ being −(β/2), and the front luminance was measured. The results are presented in Table 2 below.

TABLE 2

| Retardation value (nm) | Front luminance (cd/m$^2$) |
| --- | --- |
| 16 | 503 |
| 30 | 516 |
| 120 | 715 |
| 140 | 778 |
| 190 | 902 |
| 240 | 972 |
| 260 | 977 |
| 280 | 975 |
| 330 | 903 |
| 390 | 768 |
| 410 | 720 |
| 480 | 602 |
| 560 | 598 |
| 870 | 827 |
| 1140 | 676 |
| 1780 | 598 |
| 2018 | 888 |
| 2250 | 639 |
| 4380 | 555 |
| 4800 | 643 |

As shown in Table 2, relationship between the experimentally determined retardation value of the substrate film and luminance matches to the simulation results shown in FIG. 7. Parts with higher luminance exhibit higher transmissivity of the back face side-polarizing plate, and polarization conversion to the components in the transmission axial orientation of the back face side-polarizing plate was perfected by the phase contrast substrate film. Specifically, when the retardation value of the substrate film was 140 nm or greater and 390 nm or less, 680 nm or greater and 1040 nm or less, and 1350 nm or greater and 1610 nm or less, high front luminance was developed, and the fluctuation of the luminance was regulated to be about 50% or less. Particularly, when the retardation value of the substrate film was 140 nm or greater and 390 nm or less, favorable ease in production of the substrate film was achieved, with the in-plane fluctuation of the retardation value being decreased to about 30%, and in turn, the fluctuation of the luminance could be suppressed. Additionally, when the retardation value of the substrate film was 190 nm or greater and 330 nm or less, higher luminance was developed, and the fluctuation of the luminance was regulated to be about 10% or less. Furthermore, when the retardation value of the substrate film was 240 nm or greater and 280 nm or less, lowering rate of the front luminance with respect to the peak luminance could be suppressed to about 3% or less. Therefore, adequacy of the range of the retardation value of the substrate film specified according to the present invention as described above was demonstrated.

Relationship between Phase Advancing Axial Orientation or Phase Retarding Axial Orientation, and Front Luminance A light diffusion sheet was produced by laminating a light diffusion layer on a substrate film having a certain retardation value, and this light diffusion sheet was disposed in a liquid crystal module to give the angles of β being π/4 and ψ being −(β/2). With these angles as bases, front luminance was measured in case of adapting the phase retarding axial orientation and the phase advancing axial orientation. The results are shown in Table 3 below.

TABLE 3

|  | Front luminance (cd/m$^2$) | Relative value of front luminance (%) |
| --- | --- | --- |
| Based on phase retarding axial orientation | 820 | 100 |
| Based on phase advancing axial orientation | 828 | 101 |

As shown in Table 3, decision of the crystallographic axial angle α of the substrate film with respect to the short side orientation on the basis of the phase advancing axial orientation could improve the utilization efficiency of the rays of light, and luminance of the liquid crystal display module than the decision thereof on the basis of the phase retarding axial orientation.

INDUSTRIAL APPLICABILITY

As described hereinabove, the liquid crystal display module of the present invention is useful as display devices for information such as mobile phones, personal digital assistances (PDA), personal computers and televisions, and is particularly suited for use in display devices for information having a comparatively large display.

What is claimed is:

1. A rectangular liquid crystal display module which comprises:
   a liquid crystal display element in which a liquid crystal cell is sandwiched between a pair of polarizing plates,
   an optical sheet overlaid on the back face side of the liquid crystal display element, and
   a surface illuminant backlight overlaid on the back face side of the optical sheet, the backlight being an edge light type backlight with polarized light,
   wherein the optical sheet comprises a resin substrate film having an optical anisotropy such that:
   an absolute value of the angle of the phase advancing axial orientation or phase retarding axial orientation of the substrate film, measured relative to the short side orientation, is at least π/16 but not greater than 3π/16,
   the optical sheet has an optical layer laminated on one face of the substrate film, the optical layer comprising a construction selected from the group consisting of an optical layer comprising multiple particles of a light diffusing agent and a binder therefor and an optical layer comprising a shape having micro recessions an protrusions having refractivity,
   the retardation value of the substrate film is 140 nm or greater and 390 nm or less, wherein Re is defined as:
   Re=(ny−nx)/d, wherein
   nx is the refractive index in the x-direction, the x-direction being the direction of the base advancing axial orientation of the front face of the substrate film,
   ny is the refractive index in the y direction, the y direction being the direction of the phase retarding axial orientation of the front face of the substrate film, and
   d is the thickness of the substrate,
   with the proviso that nx≠ny.

2. The liquid crystal display module according to claim 1 wherein the absolute value of the angle of the phase advancing axial orientation of the substrate film, measured relative to the short side orientation, is at least π/16 but not greater than 3π/16.

3. The liquid crystal display module according to claim 1 wherein polyethylene terephthalate or polycarbonate is used as a matrix resin constituting the substrate film.

4. The liquid crystal display module according to claim 1 wherein the optical sheet has a sticking preventive layer that is laminated on another face of the substrate film, and includes beads dispersed in a binder.

5. The liquid crystal display module according to claim 1 wherein another optical sheet is provided between the liquid crystal display element and the backlight, and
   a film having an absolute retardation value ≦60 nm is used as the substrate film of the another optical sheet.

* * * * *